(12) United States Patent
Hussey

(10) Patent No.: US 10,099,713 B1
(45) Date of Patent: Oct. 16, 2018

(54) BEACH SLED

(71) Applicant: Michael Hussey, Bronx, NY (US)

(72) Inventor: Michael Hussey, Bronx, NY (US)

(*) Notice: Subject to any disclaimer, the term of this patent is extended or adjusted under 35 U.S.C. 154(b) by 0 days.

(21) Appl. No.: 15/927,086

(22) Filed: Mar. 21, 2018

Related U.S. Application Data

(60) Provisional application No. 62/475,799, filed on Mar. 23, 2017.

(51) Int. Cl.
*B62B 19/02* (2006.01)
*B62B 13/16* (2006.01)
*B62B 13/04* (2006.01)

(52) U.S. Cl.
CPC ............ *B62B 13/043* (2013.01); *B62B 13/16* (2013.01)

(58) Field of Classification Search
CPC .......... B62B 2501/065; B62B 2202/52; B62B 19/02; B62B 15/008; B62B 13/16; B62B 2205/00
See application file for complete search history.

(56) References Cited

U.S. PATENT DOCUMENTS

| | | | | |
|---|---|---|---|---|
| 2,530,240 | A * | 11/1950 | Graham | B62B 19/02 24/335 |
| 3,625,533 | A * | 12/1971 | Boe | B62B 13/16 224/153 |
| 4,170,367 | A * | 10/1979 | Rickenbacher | B62B 13/16 280/18 |
| 4,283,068 | A * | 8/1981 | Keyser | B62B 13/16 224/158 |
| 4,887,823 | A * | 12/1989 | Hallett | A01M 31/00 280/19 |
| 6,276,698 | B1 * | 8/2001 | Calandra | B62B 15/00 280/18 |
| 6,565,101 | B2 * | 5/2003 | Jones, Jr. | B62B 15/00 280/19 |
| 7,547,024 | B1 * | 6/2009 | Dell | A01M 31/006 119/725 |
| 8,950,758 | B2 * | 2/2015 | Bysiewicz | B62B 13/18 280/13 |
| 9,327,754 | B2 * | 5/2016 | Mastromatto | B62B 15/007 |
| 2004/0017053 | A1 * | 1/2004 | Barbee | B62B 15/00 280/20 |
| 2004/0080143 | A1 * | 4/2004 | Johnson | B62B 3/027 280/651 |

* cited by examiner

*Primary Examiner* — Bryan A Evans
(74) *Attorney, Agent, or Firm* — RG Patent Consulting, LLC; Rachel Gilboy

(57) ABSTRACT

A beach sled having a first flexible panel and the second flexible panel adapted to be pulled simultaneously over a beach surface via the handle member for transporting items over beach surfaces.

20 Claims, 4 Drawing Sheets

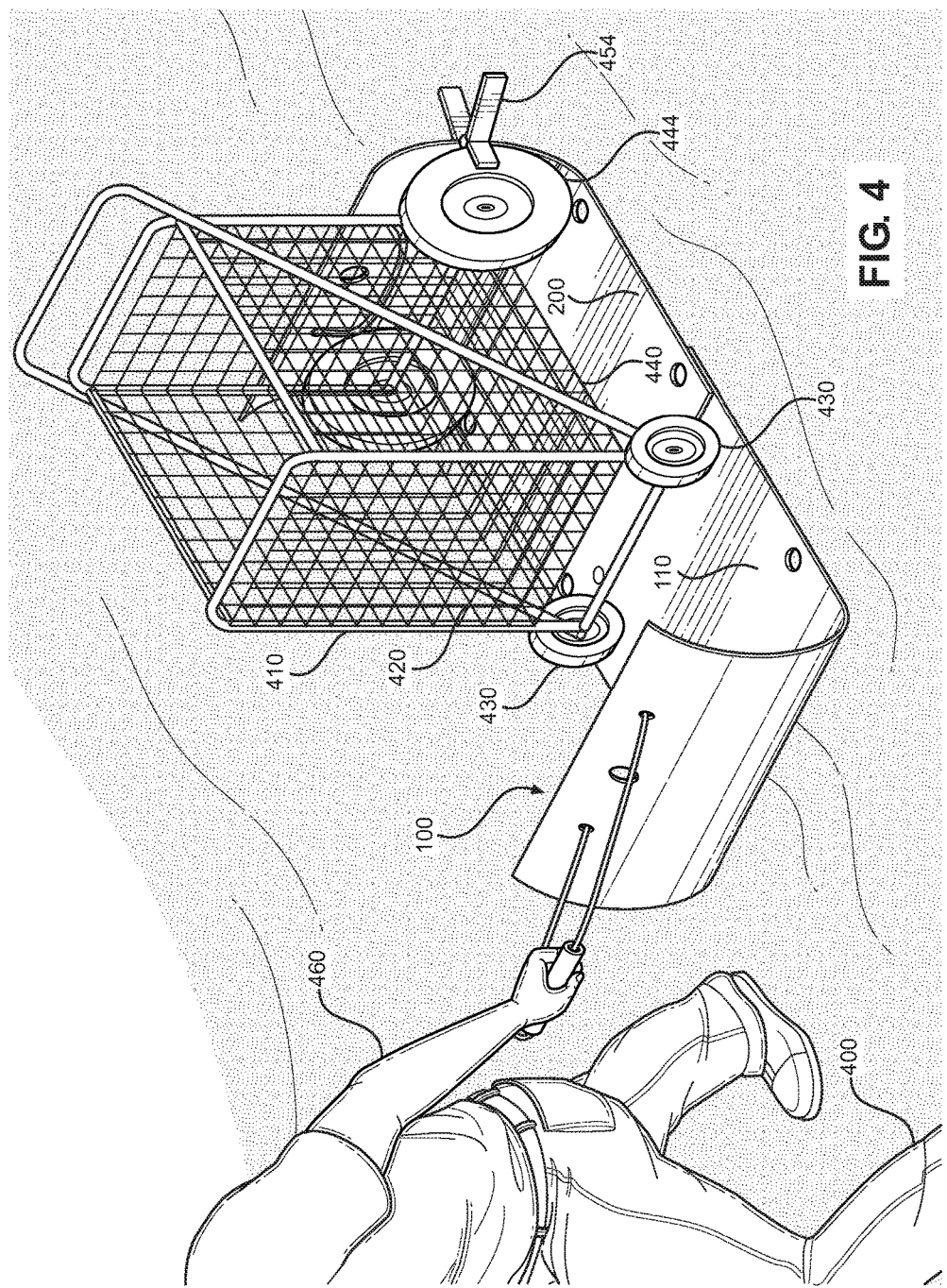

BEACH SLED

CROSS-REFERENCE TO RELATED APPLICATION

The present application is related to and claims priority from prior provisional application Ser. No. 62/475,799, filed Mar. 23, 2017 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of sleds and more specifically relates to a beach sled having a first flexible panel and the second flexible panel adapted to be pulled simultaneously over a beach surface via the handle member for transporting items over beach surfaces.

2. Description of the Related Art

To enjoy a day at the beach the sunbather and swimmers may need to take a great deal of supplies with them such as an umbrella, ice chest, swimming gear, towels, chairs, books or magazines, food items, sunscreen. To take all these items to a designated area on the beach may require numerous trips back and forth to a vehicle. The parking area may be a great distance from the beach, making the transporting of all the items to enjoy the day at the beach difficult. A need exists for a transporting means which can go over sand easily for all the items needed to enjoy a day at the beach without making trips between the beach and vehicle.

Various attempts have been made to solve problems found in sleds for transporting items art. Among these are found in: U.S. Pat. No. D573062 to Kurt Litchfield; U.S. Pat. No. 3,927,894 to Zawislak Phyllis D; and U.S. Pat. No. 6,533, 298 to Charles S. Sims. This prior art is representative of sleds for transporting items.

Ideally, a beach sled should be user-friendly and safe in-use and yet would operate reliably and be manufactured at a modest expense. Thus, a need exists for a beach sled having a first flexible panel and the second flexible panel adapted to be pulled simultaneously over a beach surface via the handle member for transporting items over beach surfaces and to avoid the above-mentioned problems.

BRIEF SUMMARY OF THE INVENTION

In view of the foregoing disadvantages inherent in the known of sled device art, the present invention provides a novel Beach Sled. The general purpose of the present invention, which will be described subsequently in greater detail is to provide a beach sled having a first flexible panel and the second flexible panel adapted to be pulled simultaneously over a beach surface via the handle member for transporting items over beach surfaces.

A beach sled comprises: a first flexible panel and a second flexible panel. The first flexible panel includes: a top surface; a bottom surface; a front edge; a back edge; two spaced side edges; a handle member; and two spaced keyholes. Wherein the two spaced side edges are located between the front and back edges. Wherein the handle member is attached to a portion of the first flexible panel in proximity to said front edge. Wherein the two spaced keyholes are located in proximity to the back edge and extend through the first flexible panel.

The second flexible panel includes: a top surface; a bottom surface; a front edge; a back edge; two spaced side edges; and two spaced locking members. Wherein the two spaced side edges are located between the front and back edges. Wherein the two spaced locking members are attached to and extend from the bottom surface thereof, are located in proximity to the front edge thereof, and are adapted to releas ably engage respectively and simultaneously with the two spaced keyholes of the first flexible panel, such that the second flexible panel can be removably attached to the first flexible panel. Wherein the first flexible panel and the second flexible panel are adapted to be pulled simultaneously over a beach surface via the handle member.

A combination of a shopping cart and a beach sled is also disclosed, the combination comprising: a shopping cart and the beach sled beach sled including a first flexible panel and a second flexible panel. The shopping cart including a basket portion adapted to hold shopping items therein; at least two wheel members rotatably connected to the basket portion; and at least one tie down strap including end connector members on opposite ends thereof. Wherein the first and second flexible panels of the beach sled further include a plurality of spaced holes therethrough in proximity to respective front, back and side edges thereof that are adapted to releasably engage respective end connector portions of the at least one tie down strap. Wherein the at least one tie down strap is used to releasably attach the shopping cart to the top surface of the first flexible panel, such that thee shopping cart can be slid across a beach surface.

The present invention holds significant improvements and serves as a Beach Sled. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, a Beach Sled, constructed and operative according to the teachings of the present invention.

FIG. 4 is a perspective view illustrating a combination of a shopping cart and a beach sled according to an embodiment of the present invention of FIG. 1.

The various embodiments of the present invention will hereinafter be described in conjunction with the appended drawings, wherein like designations denote like elements.

DETAILED DESCRIPTION

As discussed above, embodiments of the present invention relate to a sled device and more particularly to a beach sled having a first flexible panel and the second flexible panel adapted to be pulled simultaneously over a beach surface via the handle member for transporting items over beach surfaces Generally speaking, the beach sled is a sled that may be used for transporting items across a sandy beach. Beach users usually make many trips between the beach and the vehicle to carry items needed for enjoying a day at the beach. With this device the user can transport numerous items they may deem necessary for the beach, without making multiple trips between the beach and vehicle. The beach ski is made of a plastic material and is approximately the size of a shopping cart with the front portion curved up. It may have fixed bungee cords for attaching the wheels of a cart or other items on it to pull through the sand.

Figure 1:
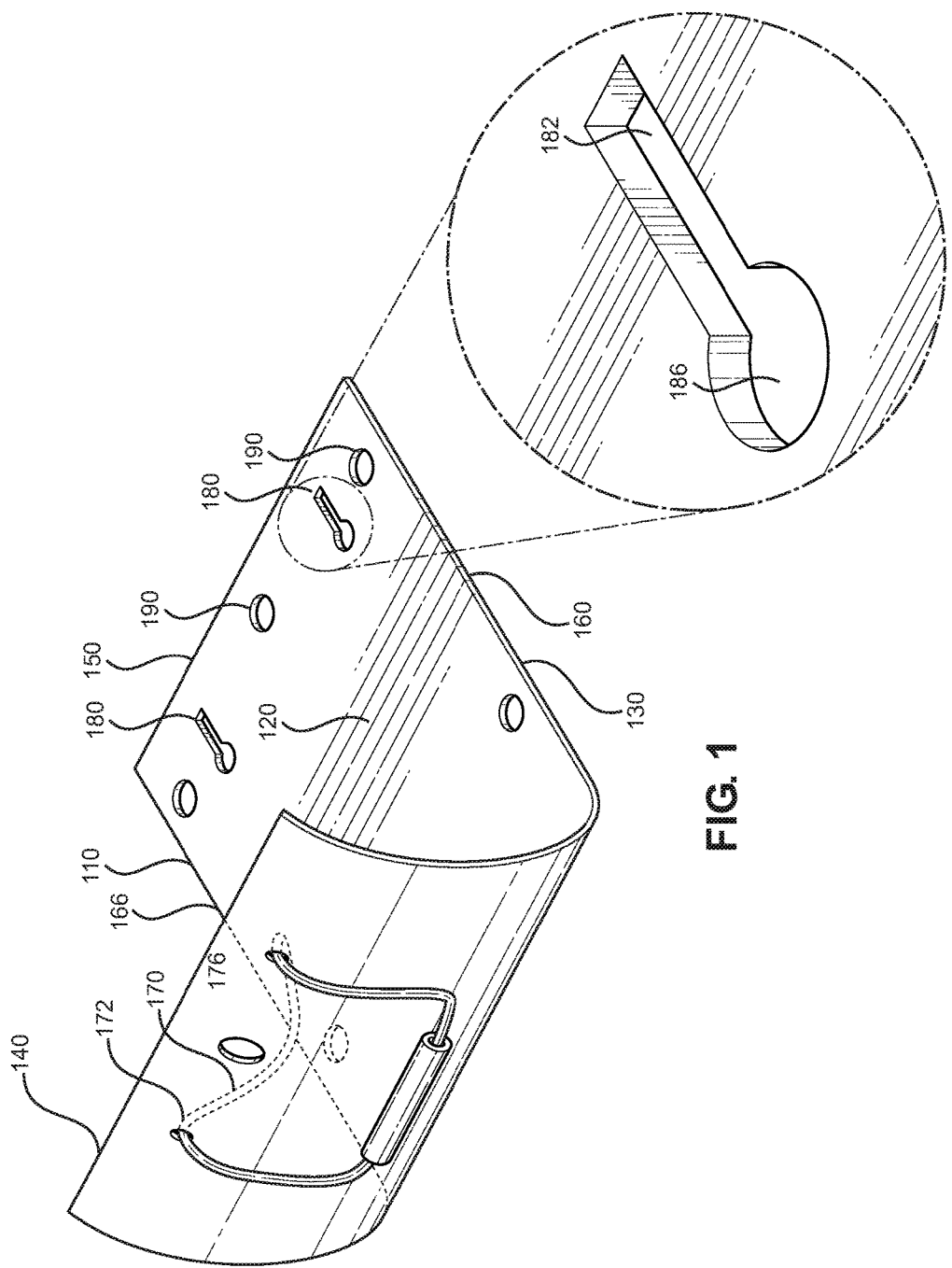
FIG. 1 shows a perspective view illustrating a first flexible panel of a beach sled according to an embodiment of the present invention.
Figure 2:
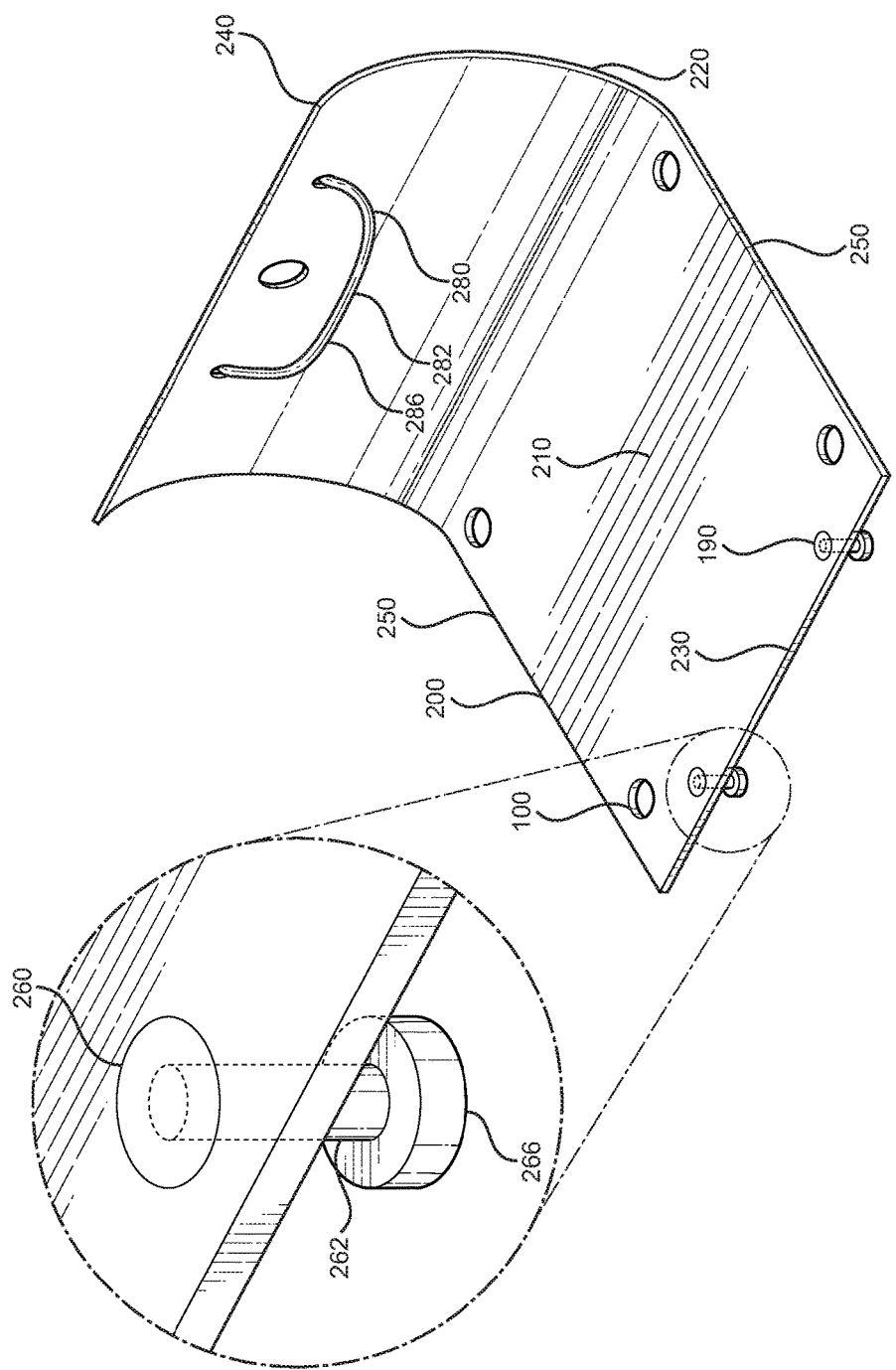
FIG. 2 is a perspective view illustrating a second flexible panel of a beach sled according to an embodiment of the present invention of FIG. 1.
Figure 3:
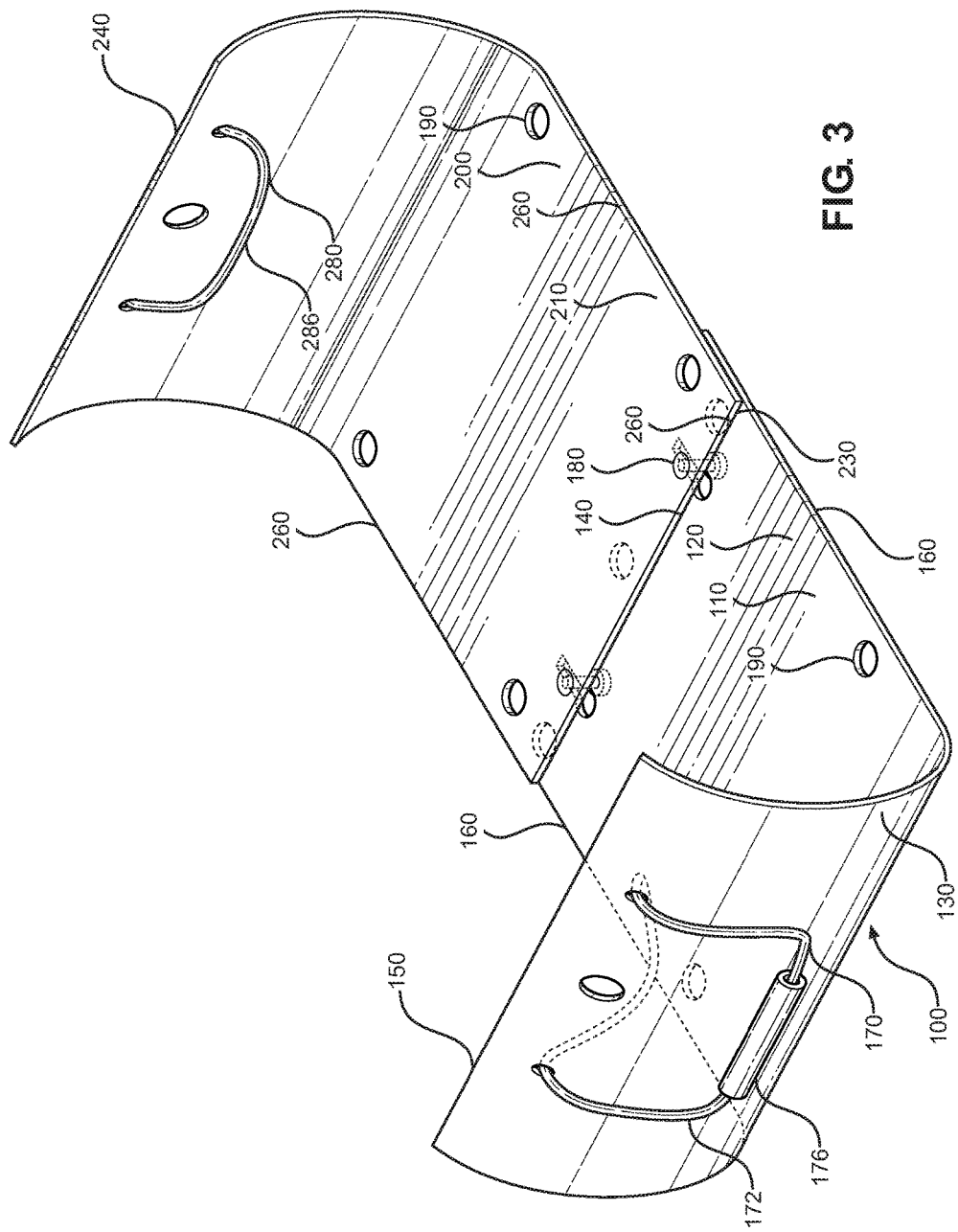
FIG. 3 is a perspective view illustrating the first flexible panel and the second flexible panel beach sled according to an embodiment of the present invention of FIG. 1.

Referring to the drawings by numerals of reference there is shown in FIGS. 1-3, perspective views illustrating beach sled 100 according to an embodiment of the present invention.

Beach sled 100 comprises: first flexible panel 110 and second flexible panel 200. First flexible panel 110 includes: top surface 120; bottom surface 130; front edge 140; back edge 150; two spaced side edges 160; first handle member 170; and two spaced keyholes 180. Wherein two spaced side edges 160 are located between front edge 140 and back edge 150. Wherein first handle member 170 is attached to a portion of first flexible panel 110 in proximity to front edge 140.

Wherein two spaced keyholes 180 are located in proximity to back edge 150 and extend through first flexible panel 110. Wherein each of two spaced keyholes 180 are formed having elongated rectangular portion 182, and round opening portion 186 having a diameter larger than a width of elongated rectangular portion 182.

Second flexible panel 200 includes: top surface 210; bottom surface 220; front edge 230; back edge 240; two spaced side edges 250; and two spaced locking members 260. Wherein two spaced side edges 250 are located between front edge 230 and back edge 240. Wherein two spaced locking members 260 are attached to and extend from bottom surface 220 thereof, are located in proximity to front edge 230 thereof, and are adapted to releasably engage respectively and simultaneously with two spaced keyholes 180 of first flexible panel 110, such that second flexible panel 200 can be removably attached to first flexible panel 110 as shown in FIG. 3. Wherein second flexible panel 200 further includes second handle member 280 attached to a portion of second flexible panel 200 in proximity to back edge 240.

Wherein each of two spaced locking members 260 are formed having elongated post portion 262 having a width smaller than the width of elongated rectangular portion 182 of two spaced keyholes 180, and knob end portion 266 having a diameter larger than a width of elongated post portion 262, the diameter being smaller than the diameter of round opening portion 186 of two spaced keyholes 180, and the diameter being larger than the width of the elongated rectangular portion 182 of two spaced keyholes 180, such that each of two spaced locking members 260 are adapted to slidably and releasably engage with a respective one of two spaced keyholes 180 as shown in FIG. 3. Wherein two spaced locking members 260 may be formed from a plastic material. Wherein two spaced locking members 260 may also formed from a metallic material.

Wherein first flexible panel 110 and second flexible panel 200 are adapted to be pulled simultaneously over a beach surface via first handle member 170 or second handle member 280 as shown in in-use condition 460 of FIG. 4. Wherein first flexible panel 110 and second flexible panel 200 are formed from a plastic material. Wherein first flexible panel 110 and second flexible panel 200 further include plurality of spaced holes 190 therethrough in proximity to front edge 140; back edge 150; two spaced side edges 160 of first flexible panel 110, and front edge 230; back edge 240; two spaced side edges 250 of second flexible panel 200 of thereof that are adapted to releasably engage end connector members 444 of tie down straps 440 as shown in FIG. 4. Wherein first handle member 170 of first flexible panel 110 includes first stretchable cord member 172 and handle portion 176 attached to first stretchable cord member 172. second handle member 280 of second flexible panel 200 also includes second stretchable cord member 282 and second handle portion 286 attached to stretchable cord member 282.

Referring now to FIG. 4, showing perspective views illustrating combination 400 of shopping cart 410 and beach sled 100 according to an embodiment of the present invention of FIG. 1

Combination 400 of shopping cart 410 and beach sled 100 is also disclosed, combination 400 comprising: shopping cart 410 and beach sled 100 including first flexible panel 110 and second flexible panel 200. Shopping cart 410 includes basket portion 420 adapted to hold shopping items therein; at least two wheel members 430 rotatably connected to basket portion 430; and at least one tie down strap 440 including end connector members 444 on opposite ends thereof. Combination 400 further comprising two clip members 450 adapted to releasably connect two of at least two wheel members 430 to top surface 120 of first flexible panel 110. Wherein two clip members 450 are formed as spring clip members 454.

Wherein the at least one tie down strap 440 is used to releasably attach shopping cart 410 to top surface 120 of first flexible panel 110, such that shopping cart 410 can be slid across a beach surface as shown in in-use condition 460. Wherein there are plurality of tie down straps 440 used to releasably attach shopping cart 410 to top surface 120 of first flexible panel 110.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A beach sled comprising:
a first flexible panel including:
a top surface;
a bottom surface;
a front edge;
a back edge;
two spaced side edges;
wherein said two spaced side edges are located between said front and back edges;
a first handle member;
wherein said first handle member is attached to a portion of said first flexible panel in proximity to said front edge; and
two spaced keyholes;
wherein said two spaced keyholes are located in proximity to said back edge and extend through said first flexible panel; and
a second flexible panel including:
a top surface;
a bottom surface;
a front edge;
a back edge;
two spaced side edges;
wherein said two spaced side edges are located between said front and back edges; and
two spaced locking members;
wherein said two spaced locking members are attached to and extend from said bottom surface thereof, are located in proximity to said front edge thereof, and are adapted to releasably engage respectively and simultaneously with said two spaced keyholes of said first flexible panel, such that said second flexible panel can be removably attached to said first flexible panel;
wherein said first flexible panel and said second flexible panel are adapted to be pulled simultaneously over a beach surface via said first handle member.

2. The beach sled of claim 1, wherein each of said two spaced keyholes are formed having an elongated rectangular portion, and a round opening portion having a diameter larger than a width of said elongated rectangular portion.

3. The beach sled of claim 2, wherein each of said two spaced locking members are formed having an elongated post portion having a width smaller than said width of said elongated rectangular portion of said two spaced keyholes, and a knob end portion having a diameter larger than a width of said elongated post portion, said diameter being smaller than said diameter of said round opening portion of said two spaced keyholes, and said diameter being larger than said width of said elongated rectangular portion of said two spaced keyholes, such that each of said two spaced locking members are adapted to slidably and releasably engage with a respective one of said two spaced keyholes.

4. The beach sled of claim 1, wherein said second flexible panel further includes a second handle member attached to a portion of said second flexible panel in proximity to said back edge.

5. The beach sled of claim 1, wherein said first and second flexible panels are formed from a plastic material.

6. The beach sled of claim 5, wherein said two spaced locking members are formed from a plastic material.

7. The beach sled of claim 5, wherein said two spaced locking members are formed from a metallic material.

8. The beach sled of claim 1, wherein said first and second flexible panels further include a plurality of spaced holes therethrough in proximity to respective said front, back and side edges thereof that are adapted to releasably engage end connector members of tie down straps.

9. The beach sled of claim 4, wherein said handle members of said first and second flexible panels each include a stretchable cord member and a handle portion attached to said stretchable cord member.

10. A combination of a shopping cart and a beach sled, said combination comprising:
a shopping cart including:
a basket portion adapted to hold shopping items therein;
at least two wheel members rotatably connected to said basket portion;
at least one tie down strap including:
end connector members on opposite ends thereof;
a beach sled comprising:
a first flexible panel including:
a top surface;
a bottom surface;
a front edge;
a back edge;
two spaced side edges;
wherein said two spaced side edges are located between said front and back edges;
a handle member;
wherein said handle member is attached to a portion of said first flexible panel in proximity to said front edge; and
two spaced keyholes;
wherein said two spaced keyholes are located in proximity to said back edge and extend through said first flexible panel; and
a second flexible panel including:
a top surface;
a bottom surface;
a front edge;
a back edge;
two spaced side edges;
wherein said two spaced side edges are located between said front and back edges; and
two spaced locking members;
wherein said two spaced locking members are attached to and extend from said bottom surface thereof, are located in proximity to said front edge thereof, and are adapted to releasably engage respectively and simultaneously with said two spaced keyholes of said first flexible panel, such that said second flexible panel can be removably attached to said first flexible panel;
wherein said first flexible panel and said second flexible panel are adapted to be pulled simultaneously over a beach surface via said handle member;
wherein said first and second flexible panels further include a plurality of spaced holes therethrough in proximity to respective said front, back and side edges thereof that are adapted to releasably engage respective said end connector portions of said at least one tie down strap; and wherein said at least one tie down strap is used to releasably attach said shopping cart to said top surface of said first flexible panel, such that said shopping cart can be slid across a beach surface.

11. The combination of claim 10, wherein each of said two spaced keyholes are formed having an elongated rectangular portion, and a round opening portion having a diameter larger than a width of said elongated rectangular portion.

12. The combination of claim 11, wherein each of said two spaced locking members are formed having an elongated post portion having a width smaller than said width of said elongated rectangular portion of said two spaced keyholes, and a knob end portion having a diameter larger than a width of said elongated post portion, said diameter being smaller than said diameter of said round opening portion of said two spaced keyholes, and said diameter being larger than said width of said elongated rectangular portion of said two spaced keyholes, such that each of said two spaced locking members are adapted to slidably and releasably engage with a respective one of said two spaced keyholes.

13. The combination of claim 10, wherein said second flexible panel further includes a handle member attached to a portion of said second flexible panel in proximity to said back edge.

14. The combination of claim 10, wherein said first and second flexible panels are formed from a plastic material.

15. The combination claim 14, wherein said two spaced locking members are formed from a plastic material.

16. The combination of claim 14, wherein said two spaced locking members are formed from a metallic material.

17. The combination of claim 13, wherein said handle members of said first and second flexible panels each include a stretchable cord member and a handle portion attached to said stretchable cord member.

18. The combination of claim 10, wherein there are a plurality of tie down straps used to releasably attach said shopping cart to said top surface of said first flexible panel.

19. The combination of claim 10, further comprising two clip members adapted to releasably connect two of said at least two wheel members to said top surface of said first flexible panel.

20. The combination of claim 19, wherein said two clip members are formed as spring clip members.

\* \* \* \* \*